US012561360B2

(12) United States Patent
    Fujita

(10) Patent No.: US 12,561,360 B2
(45) Date of Patent: Feb. 24, 2026

(54) INFORMATION PROCESSING APPARATUS, INFORMATION PROCESSING SYSTEM, INFORMATION PROCESSING METHOD, AND NON-TRANSITORY RECORDING MEDIUM

(71) Applicant: Takehiro Fujita, Kanagawa (JP)

(72) Inventor: Takehiro Fujita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/591,601

(22) Filed: Feb. 29, 2024

(65) Prior Publication Data

US 2024/0311414 A1     Sep. 19, 2024

(30) Foreign Application Priority Data

Mar. 17, 2023     (JP) ................................. 2023-043555

(51) Int. Cl.
     *G06F 16/38*          (2019.01)
(52) U.S. Cl.
     CPC .................................... *G06F 16/38* (2019.01)
(58) Field of Classification Search
     CPC ...................................................... G06F 16/38
     See application file for complete search history.

(56) References Cited

U.S. PATENT DOCUMENTS

| 10,133,993 B2 * | 11/2018 | Rathod | ................... | G06Q 10/00 |
| 12,333,996 B2 * | 6/2025 | Kim | ........................ | G09G 3/32 |

| 2016/0179810 | A1 * | 6/2016 | Bolshinsky | ............ | G06Q 50/01 |
| | | | | | 707/723 |
| 2017/0004548 | A1 * | 1/2017 | Goel | .................. | G06Q 30/0282 |
| 2017/0247217 | A1 | 8/2017 | Fujita | | |
| 2017/0344711 | A1 * | 11/2017 | Liu | ........................ | G06N 5/022 |
| 2018/0346271 | A1 | 12/2018 | Nakamura et al. | | |
| 2019/0057310 | A1 * | 2/2019 | Olmstead | ................. | G06N 5/02 |
| 2019/0161298 | A1 | 5/2019 | Arai et al. | | |
| 2020/0104777 | A1 * | 4/2020 | Bouhini | ......... | G06Q 10/063112 |
| 2020/0250139 | A1 * | 8/2020 | Muffat | .................. | G06F 16/182 |
| 2020/0311680 | A1 * | 10/2020 | Wahl | .................... | G06Q 10/101 |
| 2021/0375291 | A1 * | 12/2021 | Zeng | ..................... | H04L 67/306 |
| 2022/0198358 | A1 * | 6/2022 | Huang | .................... | G06F 40/30 |
| 2022/0245267 | A1 * | 8/2022 | Vangala | ............. | G06F 16/9024 |
| 2023/0068678 | A1 | 3/2023 | Fujita | | |
| 2023/0236033 | A1 * | 7/2023 | Simoudis | .......... | G01C 21/3423 |
| | | | | | 701/425 |

(Continued)

FOREIGN PATENT DOCUMENTS

| JP | 2005-108123 A | 4/2005 |
| JP | 2008-181278 A | 8/2008 |

(Continued)

*Primary Examiner* — Mohammad S Rostami
(74) *Attorney, Agent, or Firm* — IPUSA, PLLC

(57)          ABSTRACT

An information processing apparatus includes circuitry to acquire, from a first data group, a second data group related to a person. The first data group includes a plurality of types of data. The circuitry extracts a character string indicating knowledge related to the person from the second data group and determines whether a sharing status of the knowledge is appropriate based on a third data group to obtain a determination result. The third data group is an extraction source of the character string in the second data group. The circuitry outputs information based on the determination result.

7 Claims, 15 Drawing Sheets

(56)     References Cited

U.S. PATENT DOCUMENTS

2024/0296425 A1 *   9/2024  Rosenkranz .......... G06F 40/197
2024/0354352 A1 *  10/2024  Sachan ............... G06F 16/9535
2025/0190866 A1 *   6/2025  Galvin ................... G06N 20/00

FOREIGN PATENT DOCUMENTS

JP          2010-218432  A      9/2010
JP          2016-071731  A      5/2016

* cited by examiner

| EMPLOYEE ID | NAME | POSITION | DEPARTMENT AFFILIATION |
|---|---|---|---|
| A00000 | ··· | ORGANIZATIONAL POSITION | DEVELOPMENT DEPARTMENT 1 |
| A00001 | ··· | MANAGEMENT POSITION (NON-ORGANIZATIONAL POSITION) | PLANNING DEPARTMENT |
| B00000 | ··· | NON-ORGANIZATIONAL POSITION | ACCOUNTING DEPARTMENT |
| ··· | ··· | ··· | ··· |

| DOCUMENT ID | DOCUMENT TITLE | CREATOR | UPDATE HISTORY | FILE PATH | SUMMARY | ··· |
|---|---|---|---|---|---|---|
| 000001 | ··· | ··· | ··· | ··· | | ··· |
| 000002 | ··· | ··· | ··· | ··· | | ··· |
| : | : | : | : | : | | : |

| MEETING ID | MEETING NAME | MEETING DATE AND TIME | PARTICIPANT | AGENDA | MEETING TEXT | ··· |
|---|---|---|---|---|---|---|
| ··· | ··· | ··· | ··· | ··· | ··· | ··· |
| ··· | ··· | ··· | ··· | ··· | ··· | ··· |
| : | : | : | : | : | : | : |

| EMPLOYEE ID | KNOWLEDGE LIST | EXTRACTION SOURCE LIST |
|---|---|---|
| ··· | KNOWLEDGE a, KNOWLEDGE b, KNOWLEDGE c | DOCUMENT DATA 001, CHAT b, EMAIL c |
| ··· | ··· | ··· |
| : | : | : |

FIG. 13

| MEMBER | KNOWLEDGE | BREAKDOWN | PROPOSAL COMMENT |
|---|---|---|---|
| MEMBER A | MINISTRY OF HEALTH, LABOR AND WELFARE | NUMBER OF DOCUMENT DATA < NUMBER OF CHAT DATA, NUMBER OF DOCUMENT DATA AND OTHER DATA ≥ THRESHOLD | Member A is a key person in the Ministry of Health, Labor and Welfare, but knowledge sharing is insufficient. |
| MEMBER B | CT IMAGE | NUMBER OF DOCUMENT DATA ≥ NUMBER OF CHAT DATA | Knowledge has been accumulated. |
| MEMBER C | ZERO TRUST | NUMBER OF DOCUMENT DATA ≤ 0 | Requesting Member C to contribute to knowledge accumulation is suggested. |
| MEMBER D | NIST | NUMBER OF DOCUMENT DATA ≥ NUMBER OF CHAT DATA AND NUMBER OF NON-DOCUMENT DATA ≥ THRESHOLD | Member D is a key person for "NIST", and knowledge sharing is sufficient. |

| EMPLOYEE ID | SPECIALIZED FIELD |
|---|---|
| AAA | DEVELOPMENT/SECURITY |
| BBB | LEGAL AFFAIRS |
| CCC | DEVELOPMENT |
| . . . | . . . |

| DEPARTMENT NAME | SPECIALIZED FIELD |
|---|---|
| XX DEVELOPMENT DEPARTMENT | DEVELOPMENT |
| YY ACCOUNTING DEPARTMENT | ACCOUNTING |
| ZZ LEGAL AFFAIRS DEPARTMENT | LEGAL AFFAIRS |
| . . . | . . . |

| KNOWLEDGE | SPECIALIZED FIELD |
|---|---|
| PRODUCT X | DEVELOPMENT |
| PERSONAL INFORMATION PROTECTION ACT | DEVELOPMENT/ LEAGAL AFFAIRS |
| MEDICAL PRACTITIONERS ACT | LEGAL AFFAIRS |
| . . . | . . . |

FIG. 21

| KNOWLEDGE | SPECIALIZED FIELD | MEMBER | SPECIALIZED FIELD | WHETHER EXCLUDE OR NOT |
|---|---|---|---|---|
| XXX1 | DEVELOPMENT | AAA | DEVELOPMENT/ SECURITY | NOT EXCLUDE |
| XXX3 | LEGAL AFFAIRS | AAA | DEVELOPMENT/ SECURITY | EXCLUDE |
| XXX1 | DEVELOPMENT | BBB | LEGAL AFFAIRS | EXCLUDE |
| XXX3 | LEGAL AFFAIRS | BBB | LEGAL AFFAIRS | NOT EXCLUDE |

INFORMATION PROCESSING APPARATUS, INFORMATION PROCESSING SYSTEM, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2023-043555, filed on Mar. 17, 2023, in the Japan Patent Office, the entire disclosure of which is hereby incorporated by reference herein.

BACKGROUND

Technical Field

Embodiments of the present disclosure relate to an information processing apparatus, an information processing system, an information processing method, and a non-transitory computer-readable medium.

Related Art

To facilitate the smooth execution of tasks in an organization, it is valuable to grasp who has what knowledge in the organization. Further, for the sustained growth and continuity of an organization, to transform the dormant knowledge and experience within the individuals constituting the organization into organizational assets and to create new knowledge is valuable.

To deal with this, some technologies have been proposed with the aim of achieving the "visualization" of knowledge for each team member.

SUMMARY

According to one or more embodiments of the present disclosure, an information processing apparatus includes circuitry to acquire, from a first data group, a second data group related to a person. The first data group includes a plurality of types of data. The circuitry extracts a character string indicating knowledge related to the person from the second data group and determines whether a sharing status of the knowledge is appropriate based on a third data group to obtain a determination result. The third data group is an extraction source of the character string in the second data group. The circuitry outputs information based on the determination result.

According to one or more embodiments of the present disclosure, an information processing system includes circuitry to acquire, from a first data group, a second data group related to a person. The first data group includes a plurality of types of data. The circuitry extracts a character string indicating knowledge related to the person from the second data group and determines whether a sharing status of the knowledge is appropriate based on a third data group to obtain a determination result. The third data group is an extraction source of the character string in the second data group. The circuitry outputs information based on the determination result.

According to one or more embodiments of the present disclosure, an information processing method includes acquiring, from a first data group, a second data group related to a person. The first data group includes a plurality of types of data. The method includes extracting a character string indicating knowledge related to the person from the second data group, determining whether a sharing status of the knowledge is appropriate based on a third data group to obtain a determination result. The third data group is an extraction source of the character string in the second data group. The method includes outputting information based on the determination result.

According to one or more embodiments of the present disclosure, a non-transitory recording medium stores a plurality of instructions which, when executed by one or more processors, causes the processors to perform the above-described method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 6 is a diagram illustrating a configuration of an employee information storage unit according to some embodiments of the present disclosure;

FIG. 7 is a diagram illustrating a configuration of a document storage unit according to some embodiments of the present disclosure;

FIG. 8 is a diagram illustrating a configuration of a meeting information storage unit according to some embodiments of the present disclosure;

FIG. 9 is a diagram illustrating a configuration of an extraction result storage unit according to some embodiments of the present disclosure;

FIG. 13 is a diagram illustrating a determination result for knowledge sharing according to some embodiments of the present disclosure;

FIG. 18 is a diagram illustrating a configuration of an individual-specific specialized field storage unit according to some embodiments of the present disclosure;

FIG. 19 is a diagram illustrating a configuration of an organization-specific specialized field storage unit according to some embodiments of the present disclosure;

FIG. 20 is a diagram illustrating a configuration of a knowledge-specific specialized field storage unit according to some embodiments of the present disclosure; and FIG. 21 is a diagram illustrating a result of processing of narrowing down knowledge according to some embodiments of the present disclosure.

Figure 1:
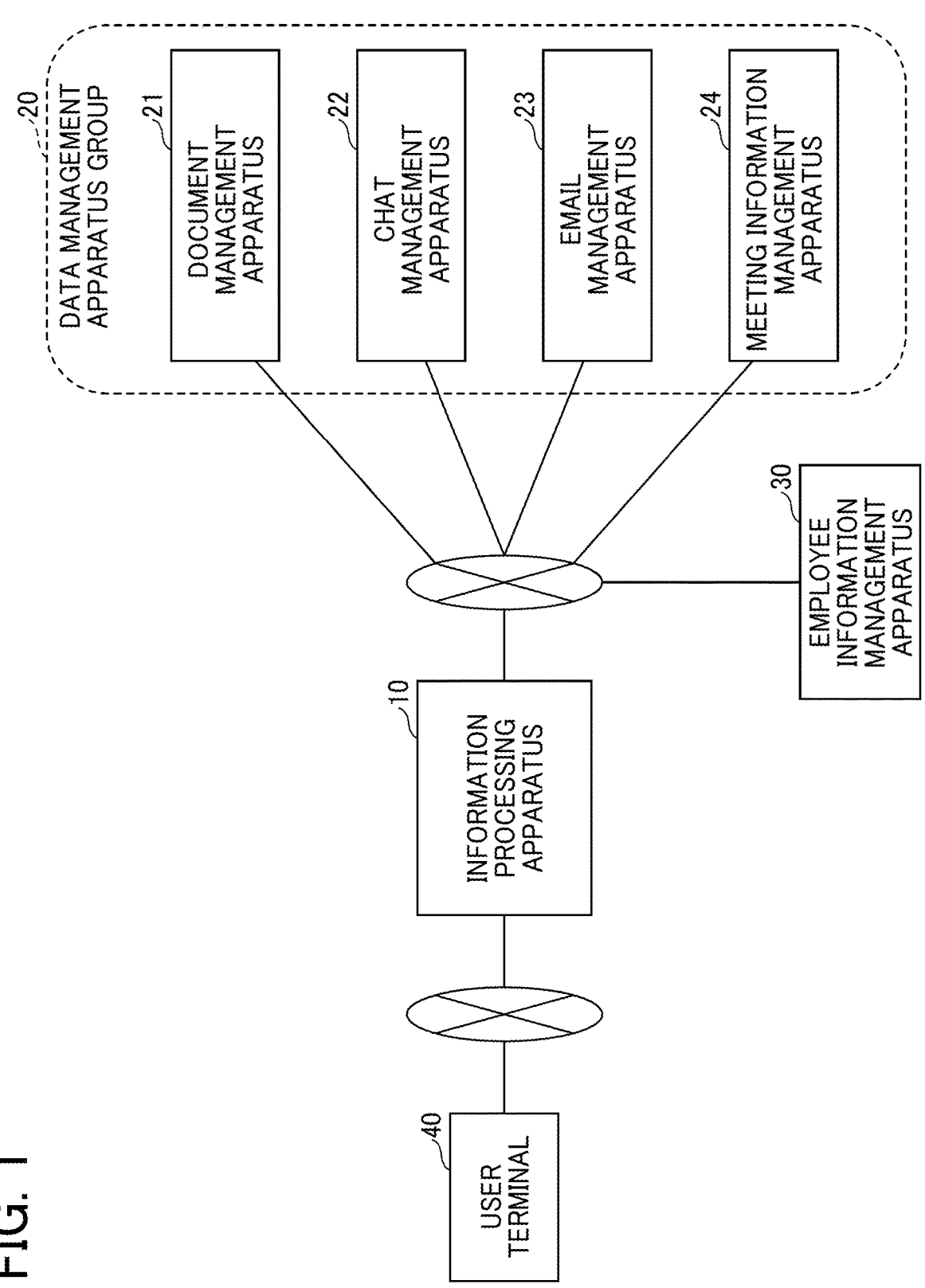
FIG. 1 is a diagram illustrating a configuration of an information processing system according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Some embodiments of the present disclosure are described below with reference to the drawings. FIG. 1 is a diagram illustrating a configuration of an information processing system according to a first embodiment. In FIG. 1, a user terminal 40 is connected to an information processing apparatus 10 via a network such as a local area network (LAN) or the Internet. The information processing apparatus 10 is connected to a data management apparatus group 20 and an employee information management apparatus 30 via a network such as a LAN or the Internet. As illustrated in FIG. 1, the data management apparatus group 20 includes, for example, a document management apparatus 21, a chat management apparatus 22, an email management apparatus 23, and a meeting information management apparatus 24. The data management apparatus group 20 is a collective term conceptualizing these individual apparatuses and may be implemented by one or more computing environments. Each of the apparatuses included in the data management apparatus group 20 is a device that stores a type of data that is different from one stored by the other apparatus. For example, different types of data refer to different storage formats (or also referred to as different stored statuses (states) or different stored forms) of data.

The usage scene (situation) of the information processing system according to the present embodiment of the present disclosure is not limited to a predetermined situation. For example, the information processing system according to the present embodiment may be used in a company. In other words, each employee in a company may be the user (not only companies but also government agencies, various organizations, unions, etc., and not only regular employees but also temporary workers, part-time employees, and other positions). In the present embodiment, each employee in the company is described as a user, but the present disclosure is not limited thereto, and can be applied to a case where the information processing system is used by a general user. One organization in a predetermined group or region, that is, the organization in the present embodiment of the present disclosure may be a company in a group of companies or an organization. In the following description of the present embodiment of the present disclosure, a scene in which the information processing system according to the present embodiment is used in a certain company (referred to as a "company X" in the following description) is given.

The document management apparatus 21 is one or more computers that store electronic documents created by employees of the company X in business operations in each of the organizations of the company X using the information processing system. The electronic documents are also referred to as "document data" in the following description.

The chat management apparatus 22 is one or more computers that store messages exchanged between employees of the company X using a chat system in business operations of each of the organizations of the company X. The messages are also referred to simply as "chat data" in the following description.

The email management apparatus 23 is one or more computers that store messages exchanged between employees of the company X using an email system in business operations in each of the organizations of the company X. The messages are also referred to simply as an "email" in the following description.

The meeting information management apparatus 24 is one or more computers that store information on a meeting held in relation to a business operation in each of the organizations of the company X. The information is also referred to as "meeting information" in the following description. The meeting information includes not only bibliographic items (for example, agenda, participants) related to the meeting but also a text (referred to as a "meeting text" in the following description) obtained by speech recognition on the minutes or the speech data of the meeting. The meeting text may be a text transcribed from speech during the meeting. The meeting information management apparatus 24 may be a device used for a remote meeting such as a web meeting or a video conferencing.

In the company X, it is desirable for various work-related information possessed by each employee (referred to as "knowledge" in the following description) to be stored as document data in document management apparatus 21. The status in which certain knowledge of an employee is stored as document data in document management apparatus 21 is considered to be a status in which that knowledge is shared. The conditions for a status in which knowledge is shared may include the systematic documentation of knowledge and high accessibility to the knowledge.

In other words, it may be considered that knowledge is shared when information (knowledge) that someone wants to know is managed in a status in which the information (knowledge) is easily and systematically accessible.

Although chat data, emails, meeting texts, etc., are also documents in a broad sense. However, in the present embodiment, the chat data, the emails, the meeting texts, etc., are clearly distinguished from the document data stored by the document management apparatus 21. In other words, in the present embodiment, knowledge included in the chat data, the emails, the meeting texts, etc., is not treated as knowledge shared in the company X. This is because the chat data, the emails, the meeting texts, etc., are data in which knowledge is recorded in time series, and the knowledge is not systematically organized.

However, which type of data is to be treated as data in the status in which knowledge is shared may be appropriately determined according to an organization such as a company. For example, in the case of a company having a knowledge database, data registered in the knowledge database may be treated as data in the status in which knowledge is shared.

The employee information management apparatus 30 is one or more computers that store information on attributes of each employee of the company X (referred to as "employee information" in the following description).

The information processing apparatus 10 is one or more computers that acquire a data group (document data, chat data, emails, meeting texts, etc.) related to each employee of the company X from the data management apparatus group 20 and extract knowledge estimated to be possessed by each employee from the data group. The information processing apparatus 10 estimates an association between each employee and knowledge and an association between employees based on, for example, a knowledge extraction result and employee information, and generates information indicating the estimation result (referred to as "association diagram" in the following description). The information processing apparatus 10 also determines a sharing status for the knowledge of each employee (whether the knowledge is sufficiently shared) based on the stored status of data in an extraction source data group. In the following description, determination for a sharing status for knowledge is referred to as "determination for knowledge sharing." The information processing apparatus 10 outputs information on an employee and knowledge determined to be insufficiently shared as a result of the knowledge sharing determination.

The user terminal 40 is a terminal used by a user of the information processing system (for example, an employee or an executive of the company X). For example, a personal computer (PC), a tablet computer, or a smartphone may be used as the user terminal 40.

Figure 2:
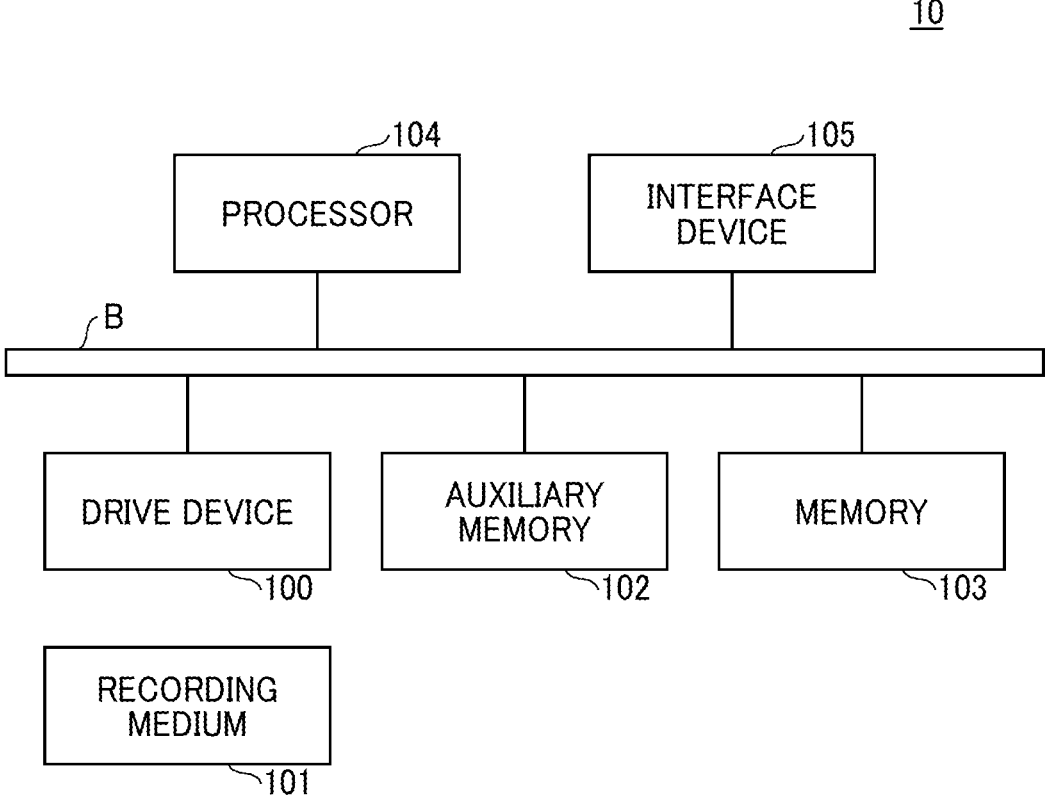
FIG. 2 is a block diagram illustrating a hardware configuration of the information processing apparatus according to the first embodiment of the present disclosure.

FIG. 2 is a block diagram illustrating a hardware configuration of the information processing apparatus 10 according to the first embodiment. The information processing apparatus 10 of FIG. 2 includes, for example, a drive device 100, an auxiliary memory 102, a memory 103, a processor 104, and an interface device 105 that are connected to each other through a bus B.

A program that implements processing of the information processing apparatus 10 is provided by a recording medium 101 such as a compact disk-read-only memory (CD-ROM). When the recording medium 101 storing the program is set in the drive device 100, the program is installed in the auxiliary memory 102 from the recording medium 101 via the drive device 100. In some embodiments, the program may be downloaded from another computer through a network, instead of installed from the recording medium 101. The auxiliary memory 102 stores the installed program and also stores files and data to be used.

In response to an instruction to activate the program, the memory 103 reads the program from the auxiliary memory

102 and stores the program. The processor 104 is a central processing unit (CPU) alone or a graphics processing unit (GPU) alone, or both of a CPU and a GPU, and executes functions related to the information processing apparatus 10 in accordance with a program stored in the memory 103. The interface device 105 is used for connecting to a network.

Figure 3:
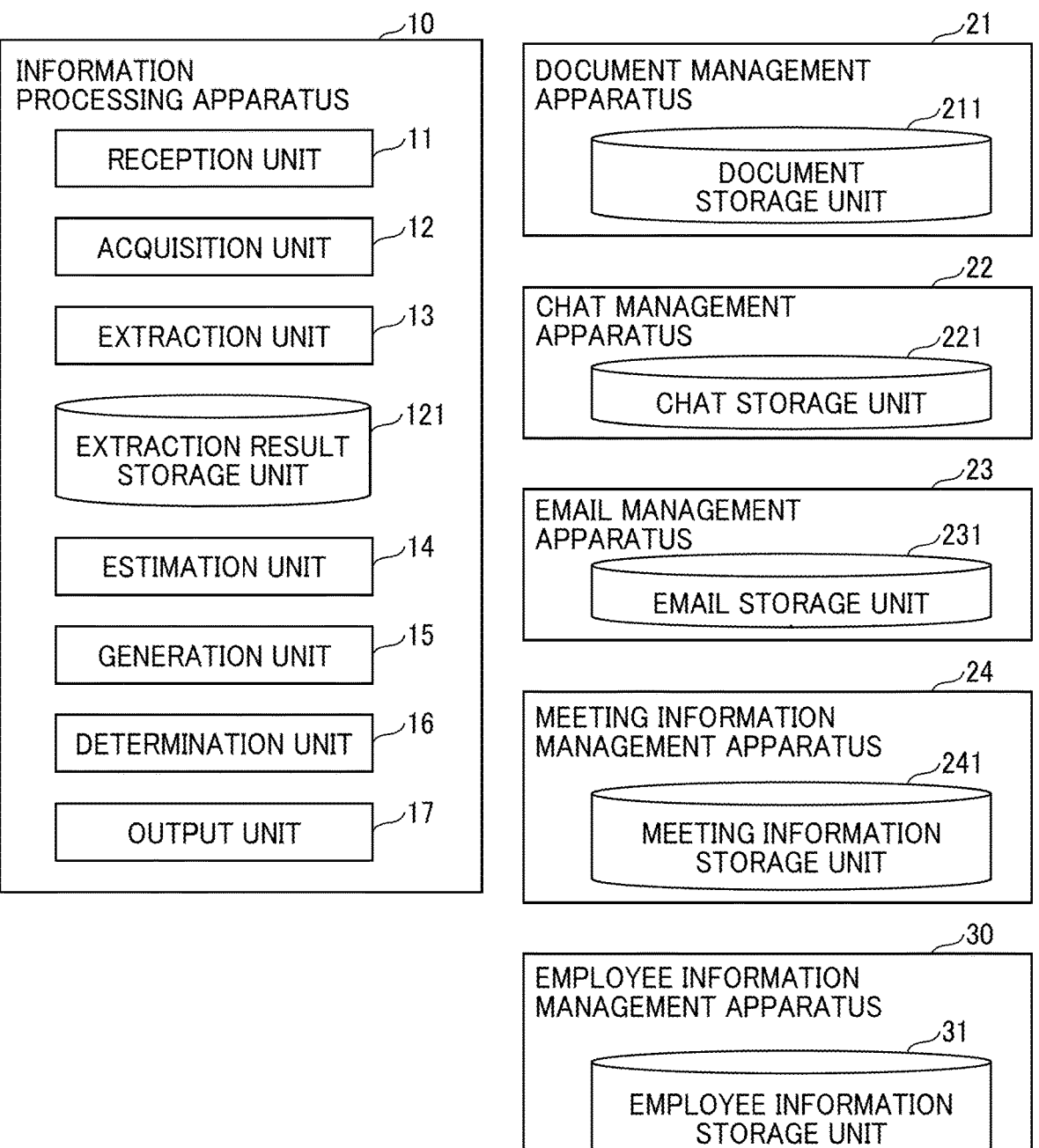
FIG. 3 is a block diagram illustrating a functional configuration of the information processing system according to the first embodiment of the present disclosure.

FIG. 3 is a block diagram illustrating a functional configuration of the information processing system according to the first embodiment. In FIG. 3, the document management apparatus 21 includes a document storage unit 211. The document storage unit 211 can be implemented by using, for example, an auxiliary memory of the document management apparatus 21. The document storage unit 211 is a database that stores document data created by one or more employees of the company X.

The chat management apparatus 22 includes a chat storage unit 221. The chat storage unit 221 can be implemented by using, for example, an auxiliary memory of the chat management apparatus 22. The chat storage unit 221 stores chat data.

The email management apparatus 23 includes an email storage unit 231. The email storage unit 231 can be implemented by using, for example, an auxiliary memory of the email management apparatus 23. The email storage unit 231 stores mails (emails). The email management apparatus 23 may include a simple mail transfer protocol (SMTP) server or a post office protocol (POP) server each of which functions as a so-called mail server.

The meeting information management apparatus 24 includes a meeting information storage unit 241. The meeting information storage unit 241 can be implemented by using, for example, an auxiliary memory of the meeting information management apparatus 24. The meeting information storage unit 241 stores meeting information.

The employee information management apparatus 30 includes an employee information storage unit 31. The employee information storage unit 31 can be implemented by using, for example, an auxiliary memory of the employee information management apparatus 30. The employee information storage unit 31 stores employee information.

The information processing apparatus 10 includes a reception unit 11, an acquisition unit 12, an extraction unit 13, an estimation unit 14, a generation unit 15, a determination unit 16, and an output unit 17. Each of the above-mentioned functional units is implemented by the processor 104 executing one or more programs installed on the information processing apparatus 10. The information processing apparatus 10 also uses an extraction result storage unit 121. The extraction result storage unit 121 can be implemented by using, for example, the auxiliary memory 102 or a storage device that is connectable to the information processing apparatus 10 via a network.

The reception unit 11 receives a request from the user terminal 40. The request from the user terminal 40 includes, for example, a generation request for an association diagram and a knowledge sharing determination request. The generation request for an association diagram is a request for generating an association diagram in a certain organization of the company X. With the generation request, identification information (organization name) of an organization (referred to as a "target organization" in the following description) for which an association diagram is to be generated is specified. The knowledge sharing determination request is a request for determining for knowledge sharing in relation to the target organization.

The acquisition unit 12 acquires, for each employee belonging to the target organization, a data group (an example of a second data group) in which multiple types of data related to the employee are combined from a data group (an example of a first data group) stored in the data management apparatus group 20.

The extraction unit 13 extracts, for each employee belonging to the target organization, one or more character strings (referred to as simply "knowledge" in the following description) indicating knowledge related to the employee (knowledge that is estimated to be possessed by the employee) from the data group related to the employee. The extraction unit 13 records, for each extracted knowledge item, the correspondence relationship with the data of the extraction source of the knowledge in the extraction result storage unit 121.

The estimation unit 14 estimates an association between employees belonging to the target organization (association among employees) based on the data group acquired by the acquisition unit 12 or the attributes of the employees belonging to the target organization.

The generation unit 15 generates an association diagram based on information stored in the extraction result storage unit 121 and an estimation result by the estimation unit 14.

The determination unit 16 determines, for each knowledge item extracted by the extraction unit 13, whether the stored status (state) (breakdown of data types) in an extraction source data group (an example of a third data group) meets a predetermined condition indicating sufficient knowledge sharing, based on the information stored in the extraction result storage unit 121.

The output unit 17 transmits (outputs) the association diagram generated by the generation unit 15 and information based on the determination result by the determination unit 16 to the user terminal 40.

Figure 4:
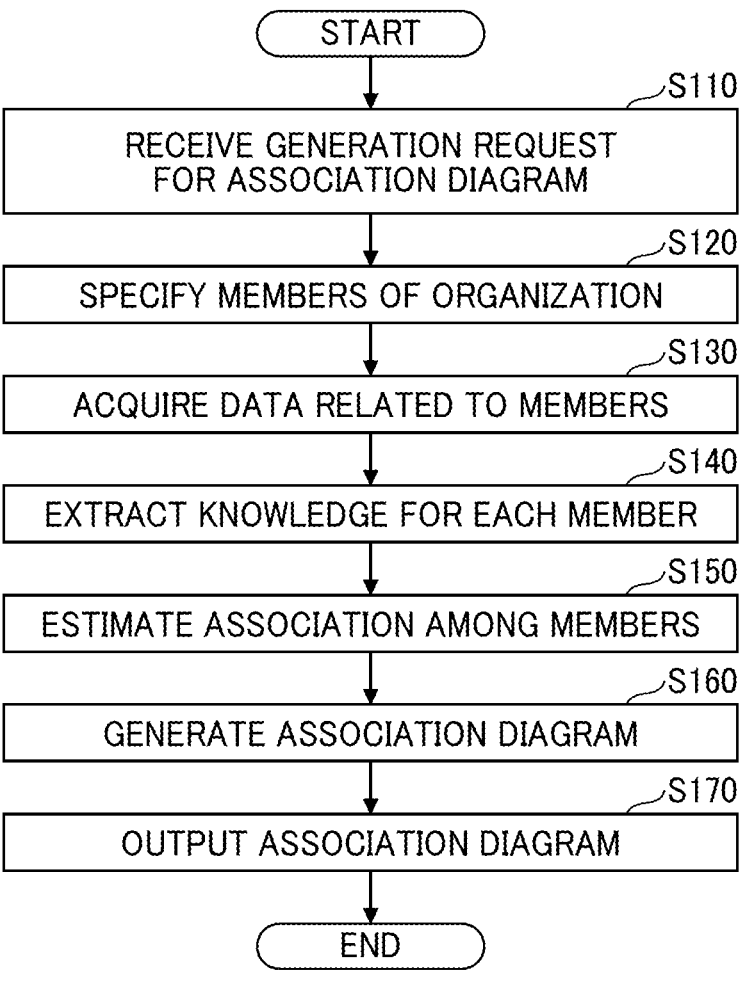
FIG. 4 is a flowchart of a process for generating an association diagram according to the first embodiment of the present disclosure.

A process executed by the information processing apparatus 10 is described below. FIG. 4 is a flowchart of a process for generating an association diagram according to the first embodiment.

In Step S110, the reception unit 11 receives a generation request for an association diagram from the user terminal 40. The generation request includes identification information (in the description of the present embodiment, "organization name") of a target organization that is the subject of generation for an association diagram. In the user terminal 40, for example, the organization name of the target organization is specified using an association diagram display screen.

Figure 5:
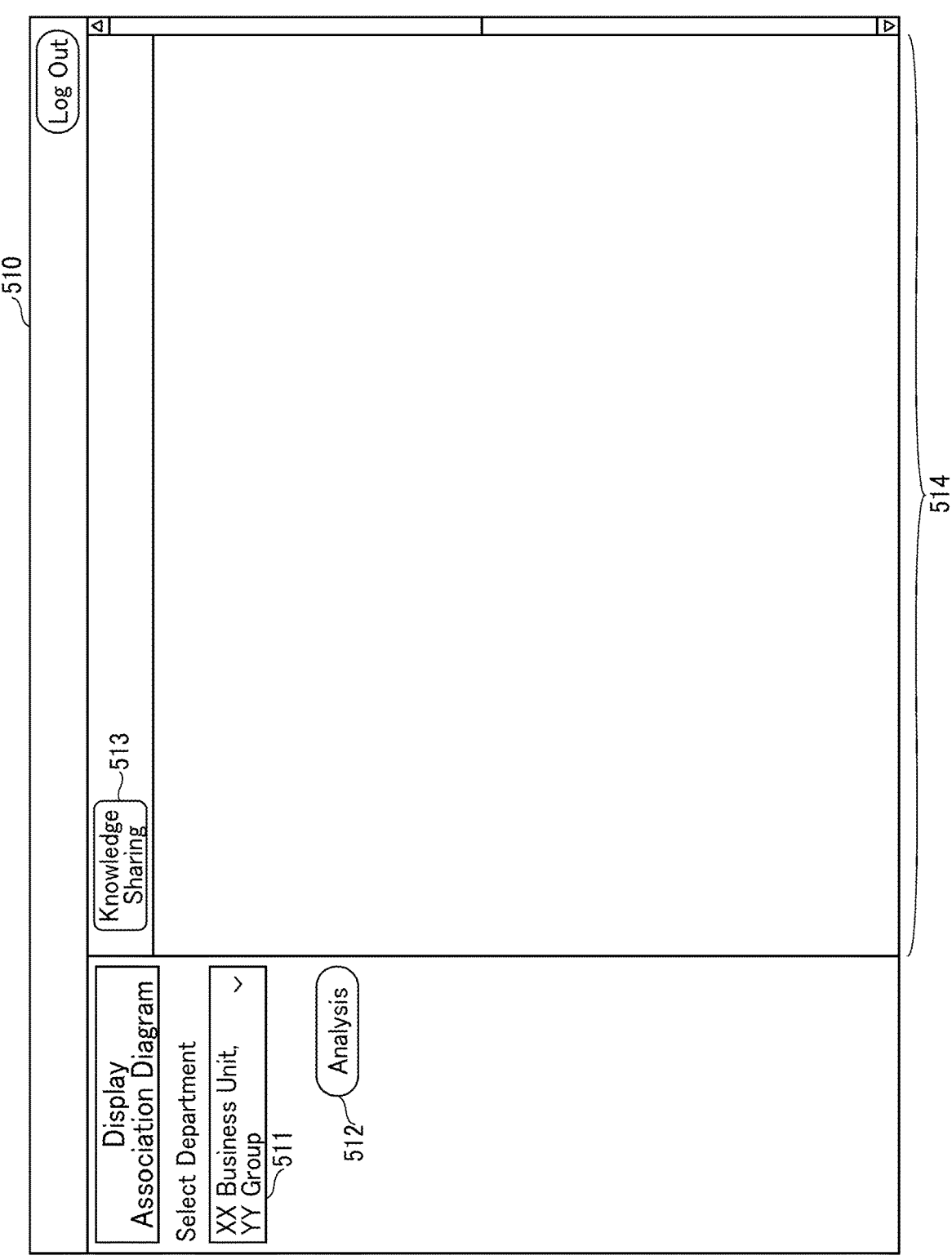
FIG. 5 is a diagram illustrating an association diagram display screen for specifying an organization name according to some embodiments of the present disclosure.

FIG. 5 is a diagram illustrating an association diagram display screen for specifying an organization name according to the first embodiment. As illustrated in FIG. 5, an association diagram display screen 510 includes, for example, an organization name selection area 511, an analysis button 512, a knowledge sharing button 513, and an association diagram display area 514.

The organization name selection area 511 is an area for receiving selection of an organization name of a target organization from a list of organization names of organizations belonging to the company X. The analysis button 512 is a button for receiving an instruction to generate an association diagram. In addition, not only the organizations corresponding to the leaf nodes when expressing the organizational hierarchy in a graph but also the organizations corresponding to the branch nodes (i.e., organizations that include multiple subordinate organizations) can be considered as candidates for the selected target organization.

When the user selects an organization name using the organization name selection area 511 and presses the analysis button 512, the user terminal 40 transmits a generation request for an association diagram including the organization name (referred to as a "target organization name" in the following description) to the information processing apparatus 10. The reception unit 11 receives the generation request in Step S110.

Subsequently, the acquisition unit 12 specifies members of the target organization based on the organization name of the target organization included in the generation request and the employee information storage unit 31 (S120).

FIG. 6 is a diagram illustrating a configuration of the employee information storage unit 31 according to the present embodiment. As illustrated in FIG. 6, the employee information storage unit 31 stores employee information that is a set of attributes including employee identification (ID), name, position, and department affiliation, for each employee of the company X. The acquisition unit 12 specifies an employee whose department affiliation belongs to the target organization as a member of the target organization (referred to as simply a "member" in the following description). The department affiliation being belonging to the target organization means that the department affiliation is the target organization or the department affiliation is a subordinate organization of the target organization. Accordingly, for example, the acquisition unit 12 can specify as a member an employee whose department affiliation aligns with the target organization name. Further, when the information is associated with identification information of the department affiliation, the identification information may be used to specify the employee as a member.

Subsequently, the acquisition unit 12 acquires, for each member, a data group that is a group of all types of data (for example, data groups in which multiple types of data such as document data, chat data, emails, and meeting texts are combined) related to the member from the data management apparatus group 20 (S130).

Document data related to a certain member is acquired from the document storage unit 211 of the document management apparatus 21. FIG. 7 is a diagram illustrating a configuration of the document storage unit 211 according to the present embodiment. As illustrated in FIG. 7, the document storage unit 211 stores, for each document (document data), a data record including items of, for example, document ID, document name, creator, update history, file path, and summary.

The document ID is identification information for identifying a document (document data). The document name is a name or a title of a document (document data). The creator is identification information for identifying the creator of the document data (for example, an employee ID in the company X). In the case of joint writing by multiple persons, the creator is a list of employee IDs of the multiple persons. The update history is information including the date of update and identification information for identifying a person who has updated the document (for example, an employee ID in the company X) for each update of the document data. The file path is the path name of a file in which the document data is stored. The summary is text indicating a summary of the contents included in the document data (for example, a summary or a set of keywords), and is used for, for example, searching for the document data.

The acquisition unit 12 acquires, for each member, document data including the employee IDs of the member in the creator or the update history based on the file path stored in the document storage unit 211.

Chat data related to a certain member is acquired from the chat storage unit 221 of the chat management apparatus 22. The acquisition unit 12 acquires, for each member, the chat data indicating the member is a sender from the chat storage unit 221. Chat data indicating the member is a recipient may also be acquired as the chat data related to the member.

An email related to a certain member is acquired from the email storage unit 231 of the email management apparatus 23. The acquisition unit 12 acquires, for each member, an email sent by the member from the email storage unit 231. An email received by the member may also be acquired as an email related to the member.

Meeting texts related to a certain member is acquired from the meeting information storage unit 241 of the meeting information management apparatus 24. FIG. 8 is a diagram illustrating a configuration of the meeting information storage unit 241 according to the present embodiment. As illustrated in FIG. 8, the meeting information storage unit 241 stores, for each meeting held in the company X, a record including items of meeting ID, meeting name, meeting date and time, participant, agenda, and meeting text.

The meeting ID is an ID (identification information) assigned to each meeting in the meeting information management apparatus 24. The meeting name is the name of the meeting. The meeting date and time is the date and time when the meeting is held. The participant is employee IDs of the employees (including the organizer) who participate in the meeting. The agenda is an agenda of the meeting. The meeting text is data obtained by converting the content of the utterance in the meeting into text.

The acquisition unit 12 acquires, for each member, the meeting text in the meeting including the employee ID of the member in the participant from the meeting information storage unit 241.

Subsequently, the extraction unit 13 extracts, for each member, knowledge that is estimated to be possessed by the member from the data group acquired for the member (S140 in FIG. 4). In the present embodiment, a character string (for example, "word") that (plainly) indicates a feature of data related to a certain member is extracted as (a character string representing) knowledge that the member has. For example, the extraction unit 13 extracts, for each data item regarding a certain member, some words (character strings) having high term frequency-inverse document frequency (TF-IDF) values among the words included in the data item as knowledge of the member. In this case, the extraction unit 13 records the correspondence relationship between the extraction source of the knowledge (data including the character string indicating the knowledge) and the knowledge in the extraction result storage unit 121. Alternatively, the extraction unit 13 may aggregate a data group related to a certain member and extract some words having high TF-IDF values among the words included in the data group as knowledge of the member. In this case, the extraction unit 13 records the correspondence relationship between the extracted knowledge and data including the knowledge (or character string indicating the knowledge) in the extraction result storage unit 121. Alternatively, the extraction unit 13 may classify a data group related to a certain member into multiple (for example, a predetermined number of) clusters by clustering, aggregate a data group related to a certain member and extract some words having high TF-IDF values among the words included in the data group as knowledge of the member. In this case, clustering of the data group may be performed by vectorizing the data belonging to the data group (for example, converting the data into distributed representations) and clustering each vector. Vectorizing the data can be implemented by using a known natural language processing technique. In this case, the extraction unit 13 records the correspondence relationship between the extracted knowledge and all data belonging to the cluster from which the knowledge is extracted or data including the knowledge in the extraction result storage unit 121. In any case, the extraction unit 13 may extract a character string having a relatively high appearance frequency (for example, a character string included in data where the number of pieces of data is equal to or greater than a threshold value) as knowledge.

FIG. 9 is a diagram illustrating a configuration of the extraction result storage unit 121 according to the present embodiment. As illustrated in FIG. 9, the extraction result storage unit 121 stores, for each member, a record including items of employee ID, knowledge list, and extraction source list. The employee ID is an employee ID for identifying a member. The knowledge list is a list of knowledge extracted for the member. The extraction source list is a list of data IDs each for a piece of data representing an extraction source of a knowledge item related to the knowledge list. The data ID is identification information for identifying data. For example, the data ID of the document data is a document ID. The data ID of the chat data is an ID assigned to each piece of chat data in the chat management apparatus 22. The data ID of the email is an ID assigned to each email in the email management apparatus 23. The data ID of the meeting text is a meeting ID. The data of the extraction source of the i-th knowledge in the knowledge list ($1 \leq i \leq$ the number of elements in the knowledge list) is data related to the i-th element of the extraction source list. Since a single knowledge item may be extracted from multiple pieces of data, a single element in the extraction source list may include multiple pieces of data.

Subsequently, the estimation unit 14 estimates the presence of an association between members (S150 in FIG. 4). For example, when the target organization is an organization including multiple subordinate organizations, the estimation unit 14 may estimate (determine) the presence of an association between members having the same department affiliation. The estimation unit 14 may also estimate the presence of an association between members, where one member acts as the sender and the other as the receiver of certain chat data or a certain email, or members who are recipients of the same chat data or the same email. The estimation unit 14 may also estimate associations among members who are participants in the same meeting. Whether certain members are participants of the same meeting can be determined by referring to the meeting information storage unit 241 (see FIG. 8).

The estimation unit 14 may estimate the strength degree of an association between members who have estimated (determined) to have the association. The strength degree of the association may be expressed by a numerical value within a predetermined range based on, for example, the number of times of exchange (transmission and reception) of chat data or emails, the number of times of participation in the same meeting, or the number of pieces of document data of joint creators. In this case, for example, as the number of times mentioned above increases, the association is estimated to be stronger.

Subsequently, the generation unit 15 generates an association diagram based on the knowledge extraction result (see FIG. 9) and the estimation result of the presence of an association between the members. (S160). Specifically, the generation unit 15 generates, as an association diagram, a graph in which the extracted knowledge items and members are represented as nodes, the nodes of the members having an association are connected by edges, and the nodes of the knowledge items extracted for the members (referred to as "knowledge nodes" in the following description) and the nodes of the members (referred to as "member nodes" in the following description) are connected by edges. Even when the same knowledge item (character string) is extracted for different members, each knowledge item is regarded as a separate knowledge node. Regarding the edges corresponding to the associations between the members, the generation unit 15 may change the line style according to the strength degree of each association (line style may include variations in thickness, color, dash patterns, including solid, dotted, and wavy lines). Similarly, the generation unit 15 may change the line type of an edge corresponding to an association between a member and knowledge in accordance with the strength degree of the association. The strength degree of the association between a certain member and certain knowledge may be expressed by a numerical value within a predetermined range based on the number of data IDs stored in the element corresponding to the knowledge in the extraction source list of the record corresponding to the member in the extraction result storage unit 121 (see FIG. 9) (that is, the number of pieces extraction source data for the knowledge). The larger the number is, the stronger the association becomes.

Subsequently, the output unit 17 transmits (outputs) display information for displaying the association diagram to the user terminal 40 (S170). The user terminal 40 updates the association diagram display area 514 of the association diagram display screen 510 based on the display information.

Figure 10:
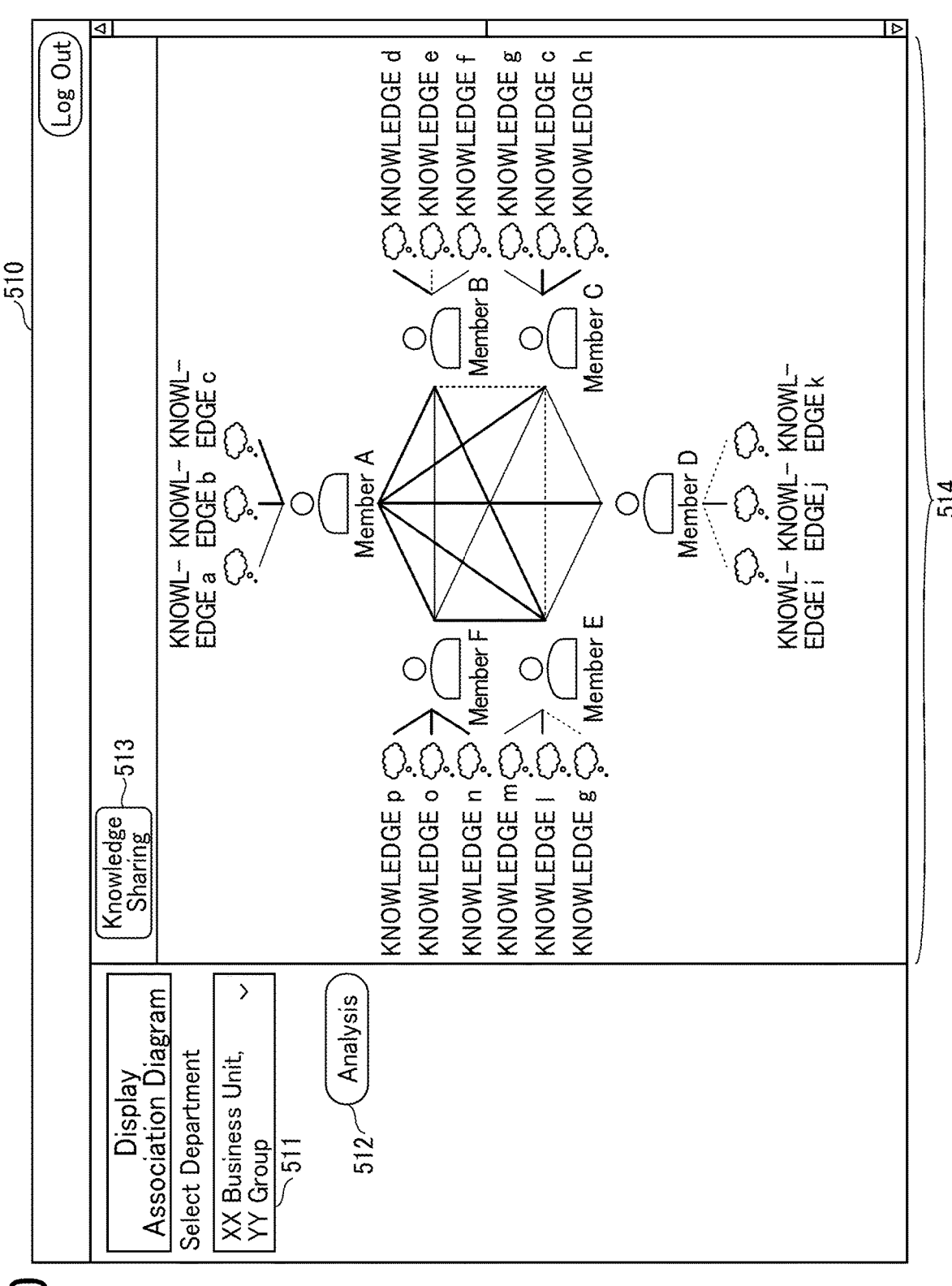
FIG. 10 is a diagram illustrating a screen displaying an association diagram according to some embodiments of the present disclosure.

FIG. 10 is a diagram illustrating a screen displaying an association diagram according to the present embodiment. In FIG. 10, like reference signs are assigned to like elements in FIG. 5, and redundant descriptions thereof are omitted below.

The association diagram display area 514 in the association diagram display screen 510 of FIG. 10 includes an association diagram. The association diagram corresponds to a case where the number of members is six. Accordingly, the association diagram includes six member nodes. In FIG. 10, each of the edges corresponding to the associations between the members and each of the edges corresponding to the associations between the members and the knowledge is represented by solid or dashed lines, with the thickness reflecting the strength degree of the association. The application of different line styles may be performed based on, for example, whether the strength degree of the association is equal to or greater than a threshold set in advance.

Although FIG. 10 illustrates an example in which the number of knowledge items of each member is the same (three knowledge nodes are connected to each member node), the number of knowledge items of each member may not be the same. In FIG. 10, each piece of knowledge is represented in an abstract form such as "knowledge a," but in practice, character strings indicating specific knowledge such as "product X," "medical care information," "medical law," and "information leakage" are displayed in the knowledge nodes.

By referring to the association diagram, the user can grasp the transactive memory of the target organization. Further, by implementing a proposal function for organizational management using the association diagram, more effective utilization of knowledge can be archived within the organization.

"Transactive Memory" is a concept related to "organizational learning" proposed in the mid-1980s by the American social psychologist Daniel Wegner. This concept emphasizes the idea that, rather than expecting the entire organization to memorize the same knowledge, the focus should be on understanding information about "who knows what" within the organization. In other words, the transactive memory refers to a state where "who knows what" is shared, rather than simply "what" being shared. In Japanese, it is translated as "exchange memory" or "interpersonal transactive memory" (see https://kotobank.jp/word/%E3%83%88%E3%83%A9%E3%83%B3%E3%82%B6%E3%82%AF%E3%83%86%E3%82%A3%E3%83%96%E3%83%BB%E3%83%A1%E3%83%A2%E3%83%AA%E3%83%BC-802402).

When the user presses the knowledge sharing button 513 on the association diagram display screen 510 (see FIG. 10), the user terminal 40 transmits a knowledge sharing determination request to the information processing apparatus 10. A process executed by the information processing apparatus 10 in this case is described.

Figure 11:
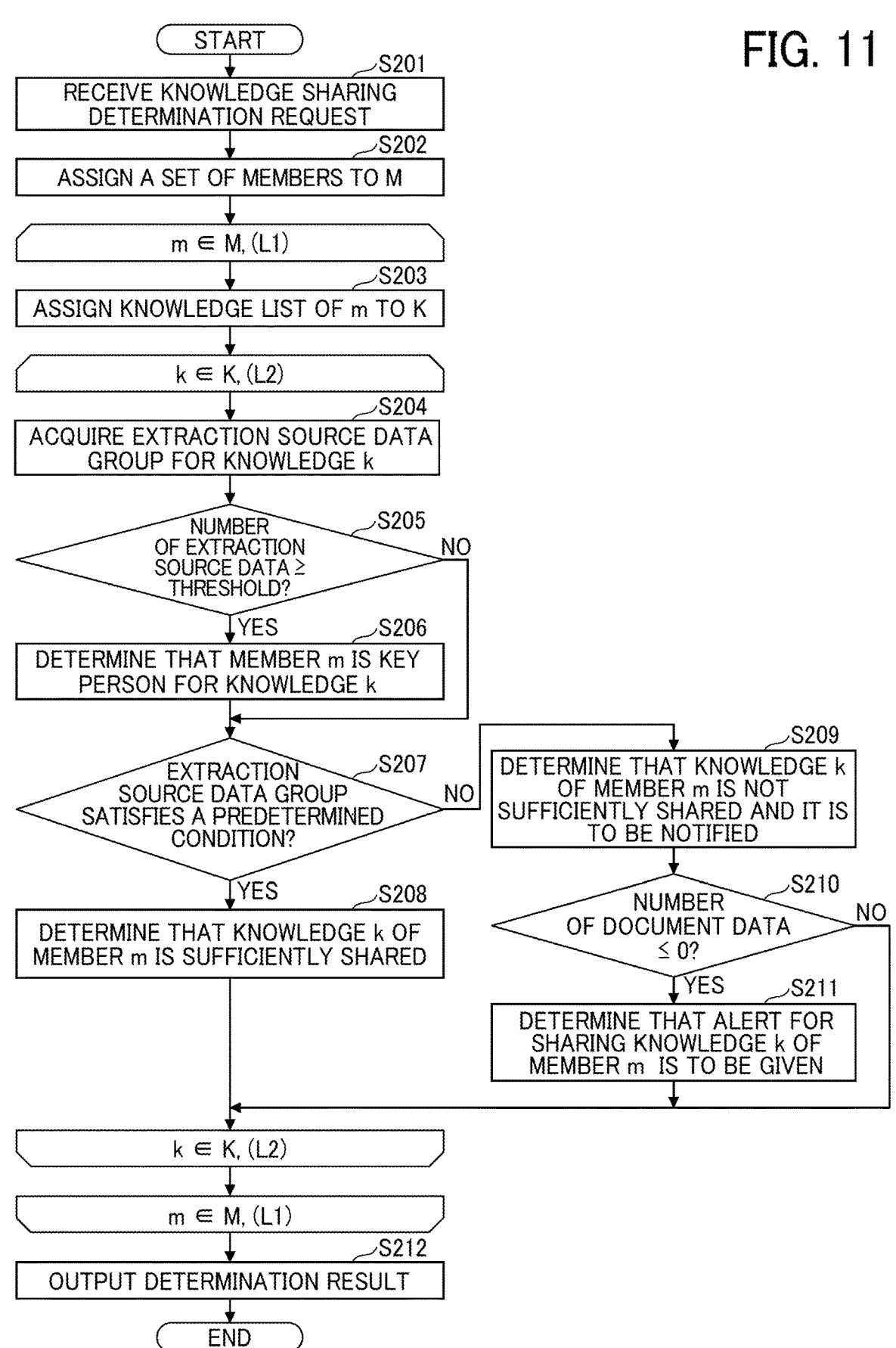
FIG. 11 is a flowchart of a process for determining for knowledge sharing according to some embodiments of the present disclosure.

FIG. 11 is a flowchart of a process for determining for knowledge sharing according to the present embodiment.

In Step S201, the reception unit 11 receives the knowledge sharing determination request transmitted from the user terminal 40.

Subsequently, the determination unit 16 assigns a set of employee IDs of the members of the target organization to a list M (S202). Subsequently, the determination unit 16 executes loop processing L1 for each of the elements in the list M (that is, for each of the employee IDs of the members). The member to be processed in the loop processing L1 is referred to as a "member m." The loop processing L1 includes Step S203 and loop processing L2.

In Step S203, the determination unit 16 assigns a knowledge list stored in the extraction result storage unit 121 (see FIG. 9) in association with the employee ID of the members m to K (S203).

Subsequently, the determination unit 16 executes loop processing L2 for each of the elements of the knowledge list K (that is, for each knowledge item). The knowledge to be processed in the loop processing L2 is referred to as "knowledge k." The loop processing L2 includes Steps S204 to S211.

In Step S204, the determination unit 16 acquires a data group for the knowledge k (referred to as "extraction source data group" in the description of the present embodiment) from the elements of the extraction source list associated with the employee ID of the member m and stored in the extraction result storage unit 121 (see FIG. 9). As described above, a single element of the extraction source list stores a data group including one or more pieces of data.

Subsequently, each of the determination unit 16 determines whether the number of pieces of document data (number of document data) and the number of pieces of data other than document data (number of non-document data), in the extraction source data group, is equal to or greater than a corresponding threshold (S205). When each of the number of pieces of document (number of document data) data and the number of pieces of data other than document data (number of non-document data) are equal to or greater than a corresponding threshold (Yes in S205), the determination unit 16 determines that the member m is a key person for the knowledge k (S206). The key person in the present embodiment of the present disclosure means a person (member) who has prepared sufficient document data for the knowledge k.

When the determination result is No in Step S205 or subsequent to Step S206, the determination unit 16 determines whether (the breakdown of) the extraction source data group satisfies a predetermined condition (S207). The predetermined condition is a condition indicating whether the accumulation as document data is sufficient. This is because, in the present embodiment, knowledge stored in the form of document data is regarded as being shared. For example, a condition that the ratio of the document data in the extraction source data group is equal to or greater than α % may be set as the condition that the document data is sufficiently accumulated. For example, the condition may be that the number of pieces of document data (number of document data) is equal to or greater than the number of pieces of other data (data other than the document data) (i.e., α=50%) in the extraction source data group. The determination in Step S207 corresponds to a determination of whether the shared status (stored status) of the knowledge k of the member m is deviated from the desirable status.

When the extraction source data group satisfies the predetermined condition (Yes in S207), the determination unit 16 determines that the knowledge k of the member m is sufficiently shared (S208).

On the other hand, when the extraction source data group does not satisfy the predetermined condition (No in S207), the determination unit 16 determines that the knowledge k of the member m is not sufficiently shared and this is to be notified (S209). Subsequently, the determination unit 16 determines whether the number of pieces of document data (number of document data) included in the extraction source data group is equal to or less than 0 (S210). When the number of pieces of document data (number of document data) included in the extraction source data group is equal to or less than 0 (Yes in S210), the determination unit 16 further determines that an alert (advice, promotion, or suggestion) for sharing the knowledge k of the member m is given (S211).

Further, subsequent to Step S209, the determination unit 16 may determine that an alert indicating an urgent need for sharing knowledge k of member m is to be given, based on the age of member m, in a case where the remaining period until the retirement age of member m is below a certain threshold. In order to enable such determination, the employee information storage unit 31 (see FIG. 6) may store the age of each employee.

In the above description, a case in which there are two choices, whether the extraction source data group satisfies the predetermined condition (Yes or No), is given, but multiple thresholds may be set for the extraction source data group. In this case, the determination unit 16 may evaluate the degree of sharing of the knowledge k of the member m in multiple stages (for example, a high level, a medium level, and a low level). Specifically, multiple thresholds may be set for the ratio of document data to the extraction source data group.

When data other than document data in the extraction source data group for the knowledge k (referred to as "data X" in the following description) is similar to the document data of an extraction source of any knowledge (not limited to the knowledge k) of the member m, the determination unit 16 may treat (count) the data X as document data.

Figure 12:
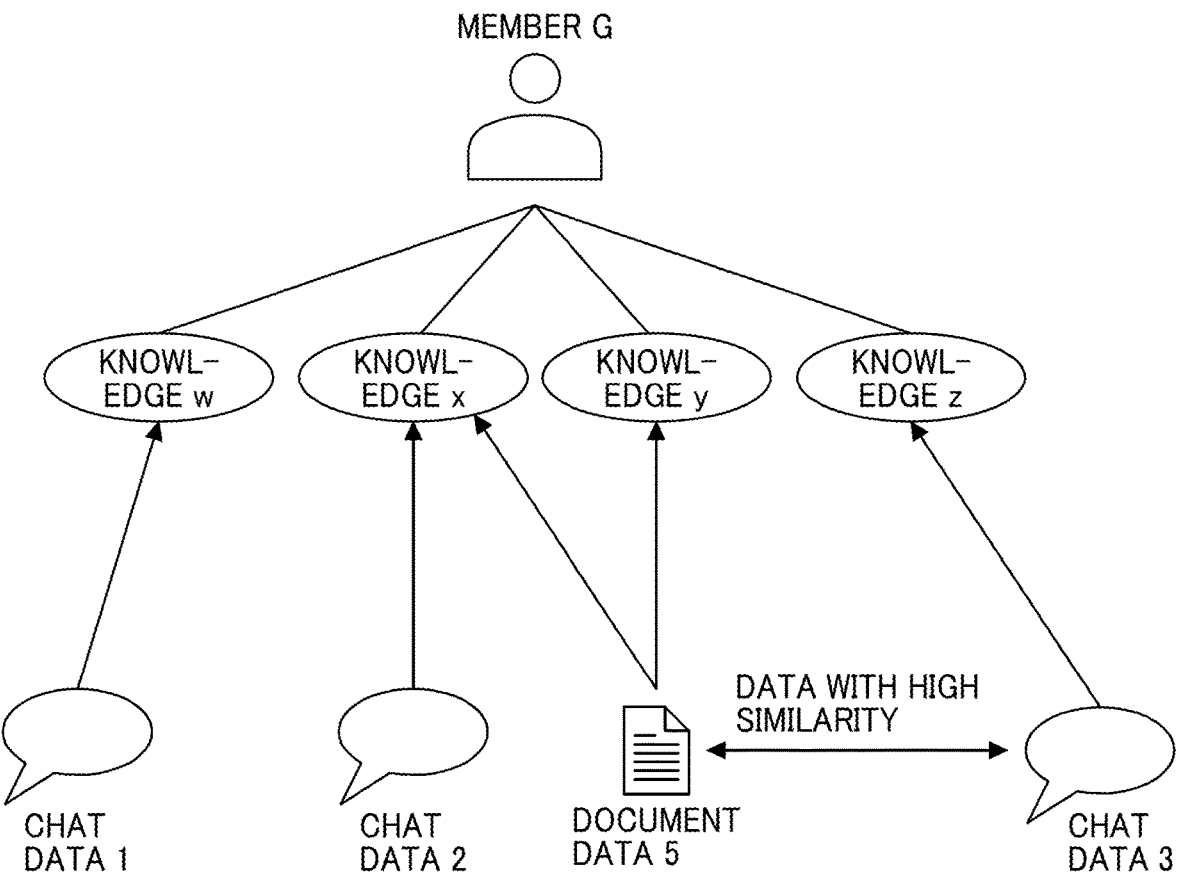
FIG. 12 is a diagram illustrating a case in which data other than document data is treated as document data in determining whether an extraction source data group satisfies a predetermined condition according to some embodiments of the present disclosure.

FIG. 12 is a diagram illustrating a case in which data other than document data is treated as document data in determining whether the extraction source data group satisfies a predetermined condition. FIG. 12 illustrates a case in which a member G has knowledge w, knowledge x, knowledge y, and knowledge z. Further, in this case, the extraction source data group of knowledge w is chat data 1, the extraction source data group of knowledge x is chat data 2 and document data 5, the extraction source data group of knowledge y is document data 5, and the extraction source data group of knowledge z is chat data 3. It is assumed that the knowledge z is similar to the document data 5. In this case, since the knowledge z is extracted from the chat data 3, it is determined that the knowledge z is not sufficiently shared. However, since the chat data 3 is similar to the document data 5, the determination unit 16 may count the chat data 3 as the document data. In this case, the extraction source of the knowledge z is the document data (the ratio of the document data is 100%), and the determination unit 16 may determine that the sharing of the knowledge z is sufficient. The similarity between data (in this case, the similarity between the chat data 3 and the document data 5) may be evaluated by vectorizing each data (converting into, for example, a distributed representation). The determination unit 16 may calculate the similarity (for example, cosine similarity) between two vectors and determine that data of the two vectors are similar to each other when the similarity is equal to or greater than a threshold value.

When the loop processing L2 is executed for all the elements (knowledge items) of the knowledge list K and the loop processing L1 is executed for all the elements (members) of the list M, the output unit 17 transmits (outputs) information including the determination result for each knowledge item of each member to the user terminal 40 (S212).

FIG. 13 is a diagram illustrating a determination result for knowledge sharing according to the present embodiment. Each record of FIG. 13 includes items of member, knowledge, breakdown, and proposal comment. The member and the knowledge are the member and the knowledge for the determination result. The breakdown is a breakdown of the extraction source data group. The proposal comment is a comment to be output as a proposal based on the determination result. For example, templates of proposal comments corresponding to the determination results of Steps S206, S208, S209, and S211 may be prepared in advance, and each proposal comment may be generated by applying, for example, the name or the knowledge of the member to the template.

The first record of FIG. 13 corresponds to the determination results of Steps S206 and S209. The second record corresponds to the determination result of Step S208. The third record corresponds to the determination result of Step S211. The fourth record corresponds to the determination results of Steps S206 and S208.

After receiving the determination result as described above, the user terminal 40 reflects the determination result on, for example, the association diagram display screen 510 of FIG. 10.

Figure 14:
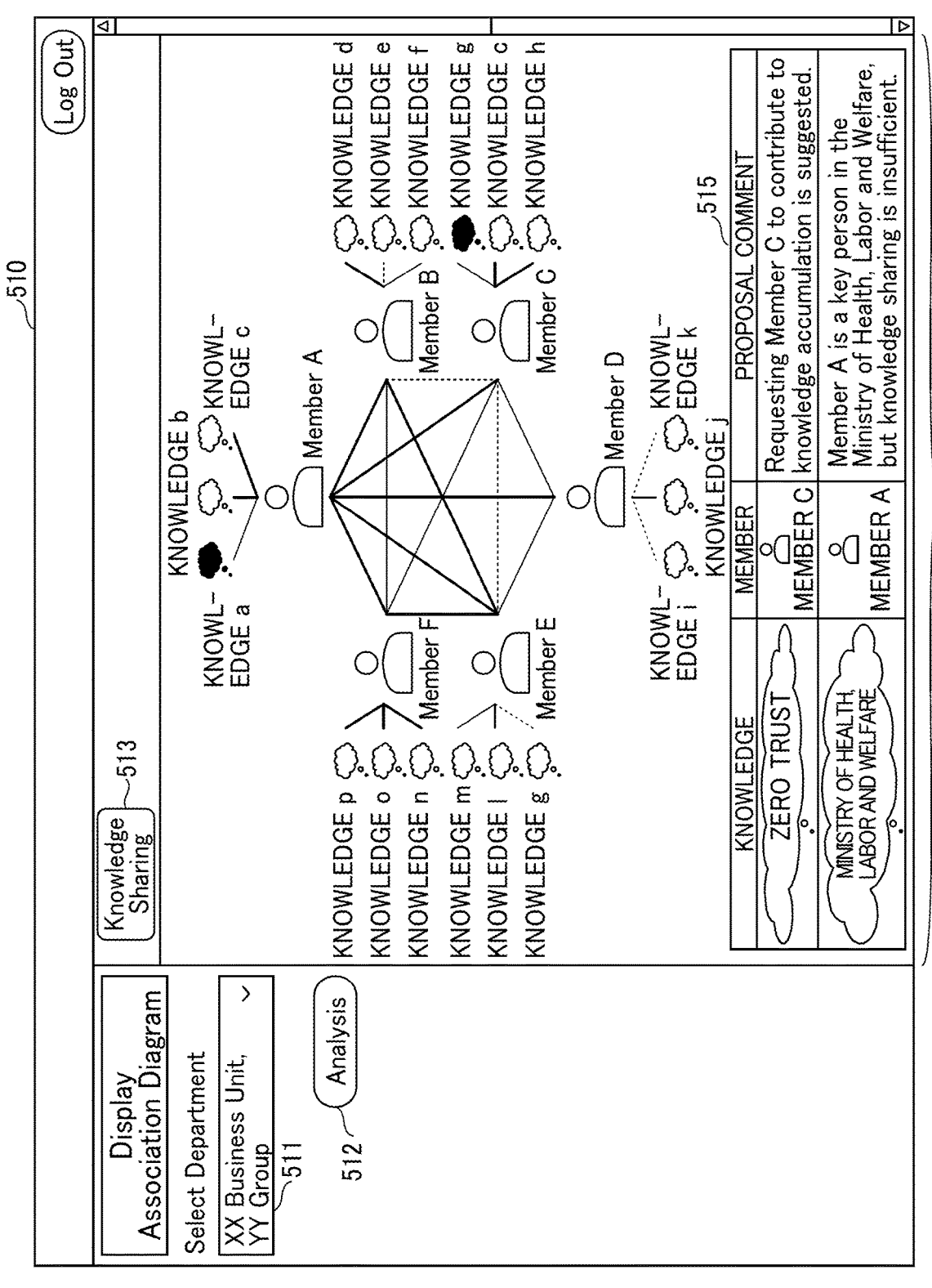
FIG. 14 is a diagram illustrating an association diagram display screen on which a determination result for knowledge sharing is reflected according to some embodiments of the present disclosure.

FIG. 14 is a diagram illustrating a display example of the association diagram display screen 510 on which the determination result for the knowledge sharing is reflected. In FIG. 14, like reference signs are assigned to like elements in FIG. 10, and redundant descriptions thereof are omitted below.

In FIG. 14, a determination result 515 is added with respect to the screen illustrated in FIG. 10. The determination result 515 includes the members, the knowledge, and the proposal comments in the case where the knowledge sharing is insufficient (the first and third records) among the determination result of FIG. 13. In the association diagram, the node of the knowledge corresponding to the determination result is highlighted (in FIG. 14, the node is painted in black). The display example of the determination result in FIG. 14 is an example. The determination result may be displayed in another manner.

As an organization, or more precisely, as a member managing the organization, it is desirable that various knowledge possessed by a particular member is in a state where it can be shared by other members, effectively accumulated as informational assets such as document data. By outputting such a determination result, an activity for knowledge sharing can be proposed to the user. The user can recognize the knowledge that is related to insufficient knowledge sharing by receiving the proposal.

As described above, according to the first embodiment, the suitability of knowledge estimated to be possessed by a certain individual (a member of the target organization) is determined, namely whether the knowledge is sufficiently shared (whether it does not deviate from the desirable sharing status) is determined, and then information (FIGS. 13 and 14) based on this determination is output. The user can recognize which knowledge possessed by which member is insufficiently shared by referring to the information, and can take an appropriate measure based on the recognition. Accordingly, the determination of the appropriateness of a sharing status for knowledge can be facilitated.

Further, according to the present embodiment, since the association diagram is output, the user can grasp who has what kind of knowledge. Further, since the association diagram includes the associations between the members (employees), the user can grasp an access route to the employee (who can introduce the employee) even if there is no direct interaction with the employee having certain knowledge.

Further, the user can grasp knowledge and personnel that are insufficient for the organization by referring to the association diagram. Accordingly, it is possible to support the organization to work on a desirable (or appropriate) sharing status of knowledge based on, for example, the grasped knowledge possession statuses and access routes to the knowledge.

A second embodiment is described below. In the second embodiment, differences from the first embodiment are described. In other words, elements, members, components, or operations of which description are omitted below may be substantially the same as those of the first embodiment.

In the description of the second embodiment, a case in which the probability that a certain member has knowledge extracted from various types of data (document data, chat data, emails, meeting texts) is evaluated, and knowledge that is estimated to be possessed by the member is narrowed down based on the evaluation result is given.

In particular, regarding a certain member, the extraction of a character string indicating certain knowledge from chat data, emails, or meeting texts alone does not necessarily imply that the member is well-versed in that knowledge. For example, in cases where a certain member is one of many recipients in a chat or email, or one of many participants in a meeting, or when a certain member temporarily handles the response on behalf of another member who should originally answer, there is a higher likelihood of such a situation in which the member is not well-versed in the knowledge.

Figure 15:
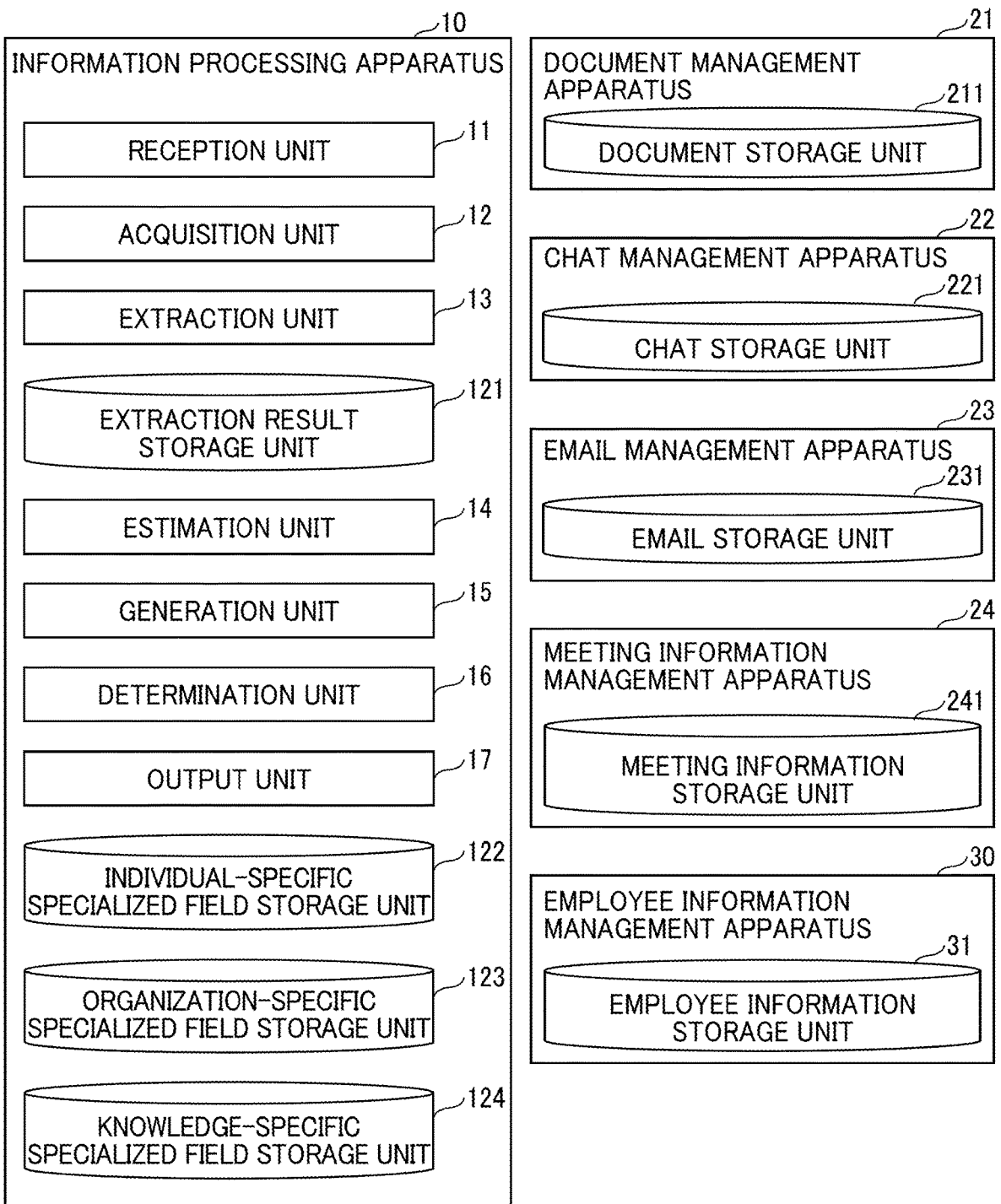
FIG. 15 is a block diagram illustrating a functional configuration of an information processing system according to a second embodiment of the present disclosure.

FIG. 15 is a diagram illustrating a functional configuration of an information processing system according to the second embodiment.

In FIG. 15, like reference signs are assigned to like elements in FIG. 3, and redundant descriptions thereof are omitted below. In FIG. 15, the information processing apparatus 10 further uses an individual-specific specialized field storage unit 122, an organization-specific specialized field storage unit 123, and a knowledge-specific specialized field storage unit 124. Each of the above-mentioned storage units can be implemented by using, for example, the auxiliary memory 102 or a storage device that is connectable to the information processing apparatus 10 via a network.

The individual-specific specialized field storage unit 122 stores correspondence information between the employees of the company X and the specialized fields.

The organization-specific specialized field storage unit 123 stores correspondence information between the organizations of the company X and the specialized fields.

The knowledge-specific specialized field storage unit 124 stores correspondence information between knowledge and the specialized fields.

Figure 16:
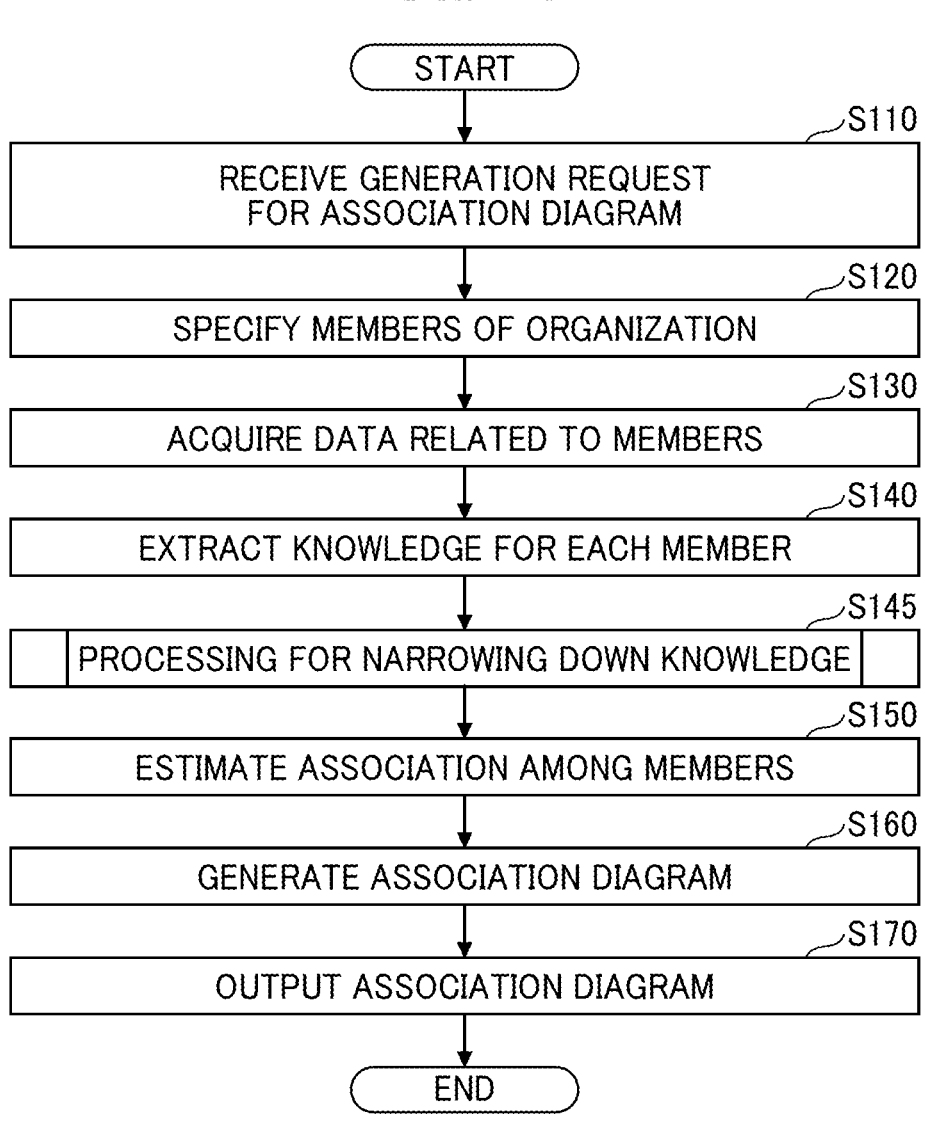
FIG. 16 is a flowchart of a process for generating an association diagram according to the second embodiment of the present disclosure.

In the second embodiment, a process of FIG. 16 is executed instead of the process of FIG. 4. FIG. 16 is a flowchart of a process for generating an association diagram according to the second embodiment. In FIG. 16, the same steps as those in FIG. 4 are denoted by the same step numbers, and the description thereof is omitted below. In FIG. 16, Step S145 is added between Step S140 and Step S150.

In Step S145, the extraction unit 13 performs processing of narrowing down the knowledge extracted for each member. Specifically, for each member, a specialized field of the member is matched with the specialized field of the knowledge, and thus the knowledge that is not in the specialized field of the member is excluded from the knowledge list extracted for the member.

Figure 17:
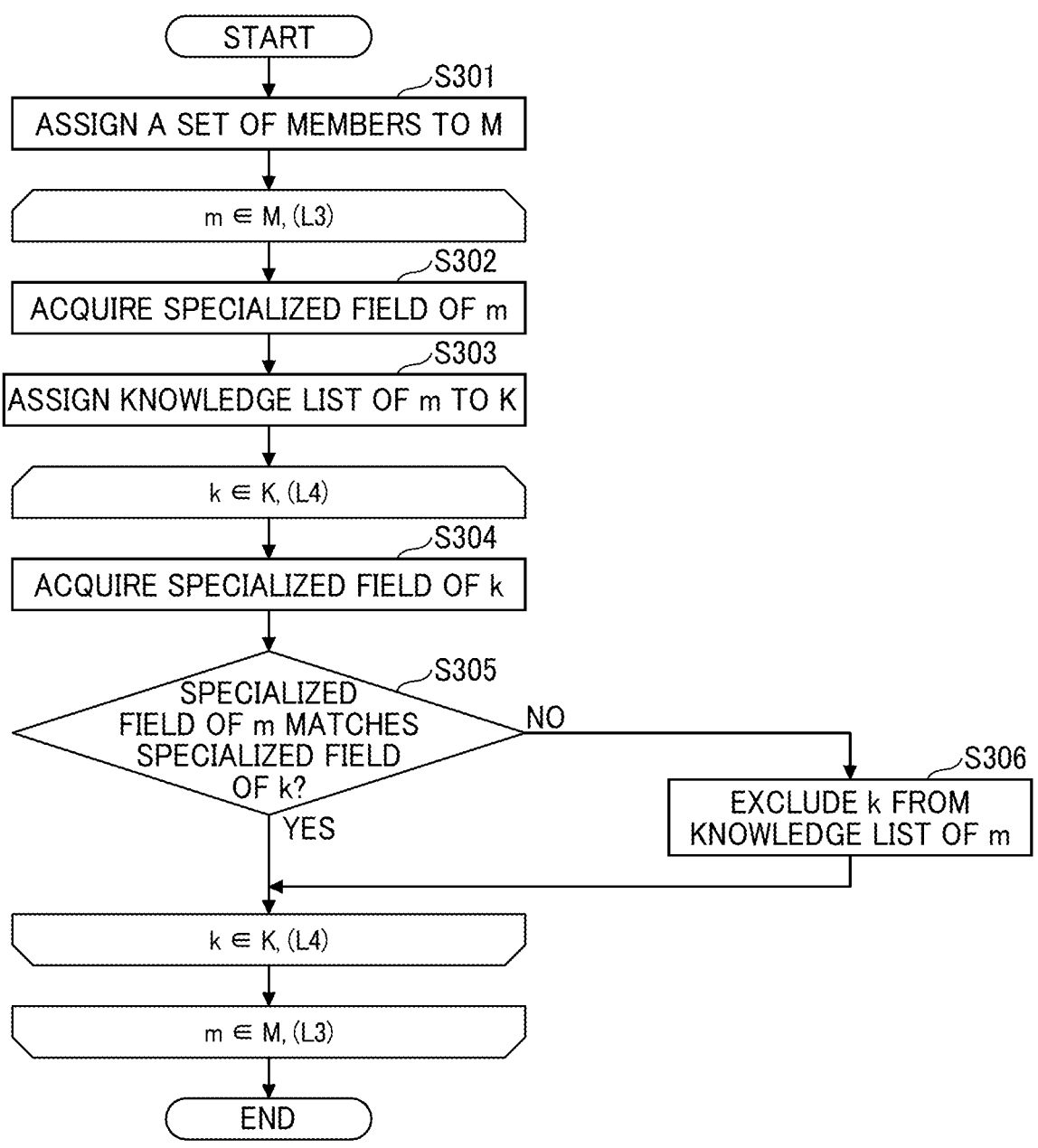
FIG. 17 is a flowchart of processing of narrowing down knowledge according to some embodiments of the present disclosure.

The details of Step S145 are described below. FIG. 17 is a flowchart of processing of narrowing down knowledge according to the present embodiment.

In Step S301, the extraction unit 13 assigns a set of employee IDs of the members of the target organization into a list M. Subsequently, the extraction unit 13 executes loop processing L3 for each of all the elements in the list M (that is, for each of the employee IDs of the members). The member to be processed in the loop processing L3 is referred to as a "member m." The loop processing L3 includes Steps S302 and S303 and loop processing L4.

In Step S302, the extraction unit 13 acquires the specialized field of the member m. The specialized field of the member m may be acquired from the individual-specific specialized field storage unit 122.

FIG. 18 is a diagram illustrating a configuration of the individual-specific specialized field storage unit 122 according to the present embodiment. As illustrated in FIG. 18, the individual-specific specialized field storage unit 122 stores, for each employee of the company X, items of employee ID and specialized field in association with each other. The specialized field corresponding to a certain employee ID is a field (knowledge category) to which the knowledge of the employee corresponding to the employee ID belongs. The specialized field of each employee may be registered based on a report of each employee or may be registered based on a report by, for example, a boss or a colleague of each employee. Further, multiple specialized fields may be registered for a single employee. The same specialized field may be registered for multiple employees. The contents stored in the individual-specific specialized field storage unit 122 may be registered in the employee information storage unit 31 (see FIG. 6). In this case, the individual-specific specialized field storage unit 122 may not be included.

When using the individual-specific specialized field storage unit 122, the extraction unit 13 acquires the specialized field corresponding to the employee ID of the member m from the individual-specific specialized field storage unit 122.

Alternatively, the specialized field of the member m may be acquired from the organization-specific specialized field storage unit 123.

FIG. 19 is a diagram illustrating a configuration of the organization-specific specialized field storage unit 123 according to the present embodiment. As illustrated in FIG. 19, the organization-specific specialized field storage unit 123 stores, for each organization of the company X, items of organization name and specialized field in association with each other. The specialized field corresponding to a certain organization name is a field (knowledge category) to which the knowledge that is possessed (or expected to be possessed) by an employee belonging to the organization of the organization name belongs. The specialized field of each organization may be registered based on a report of an employee belonging to each organization or may be registered by a person who has organized the organization. Multiple specialized fields may be registered for a single organization. The same specialized field may be registered for multiple organizations.

When using the organization-specific specialized field storage unit 123, the extraction unit 13 acquires the specialized field corresponding to the department affiliation stored in the employee information storage unit 31 (see FIG. 6) for the member m from the organization-specific specialized field storage unit 123.

Both or one of the individual-specific specialized field storage unit 122 and the organization-specific specialized field storage unit 123 may be used. When both are used, the logical sum of the specialized field acquired from the individual-specific specialized field storage unit 122 and the specialized field acquired from the organization-specific specialized field storage unit 123 may be regarded as the specialized field of the member m.

Subsequently, the extraction unit 13 assigns the knowledge list stored in the extraction result storage unit 121 (see FIG. 9) in association with the employee ID of the members m to K (S303).

Subsequently, the extraction unit 13 executes loop processing L4 for each of all elements (that is, for each knowledge item) of the knowledge list K. The knowledge to be processed in the loop processing L4 is referred to as "knowledge k." The loop processing L4 includes Steps S304 to S306. Further, among the knowledge items included in the knowledge list K, a knowledge item whose extraction source is not document data may be set to a processing target of the loop processing L4. In other words, knowledge whose extraction source is not document data may be a candidate for exclusion. This is because, although it is considered that there is high likelihood that the creator of the document data possesses the knowledge extracted from the document data, it is also considered that knowledge extracted from solely chat data, emails, or meeting texts may be attributed to a mere participant in the chat, the email, or the meeting.

In Step S304, the extraction unit 13 acquires the specialized field to which the knowledge k belongs from the knowledge-specific specialized field storage unit 124.

FIG. 20 is a diagram illustrating a configuration of the knowledge-specific specialized field storage unit 124 according to the present embodiment. As illustrated in FIG. 20, the knowledge-specific specialized field storage unit 124 stores a specialized field for each of the knowledge items of the company X in association with each other.

The specialized field corresponding to a certain knowledge item is a specialized field (knowledge category) to which the knowledge item belongs.

Alternatively, it can be said that a specialized field corresponding to certain knowledge item is a specialized field in which the knowledge indicates technical terms. A multiple specialized fields may be registered for a single knowledge item. The same specialized field may be registered for multiple knowledge items.

Subsequently, the extraction unit 13 determines whether the specialized field of the member m matches the specialized field of the knowledge k (S305). The matching condition may be satisfied, for example, when any one of the specialized fields of the member m matches any one of the specialized fields of the knowledge k, or when the specialized fields of the member m include all the specialized fields of the knowledge k.

When the specialized field of the member m does not match the specialized field of the knowledge k (No in S305), the extraction unit 13 excludes (deletes) the knowledge k from the knowledge list K. (S306). This is because, in this case, the member m is considered to be less likely to be familiar with the knowledge k.

When the loop processing L4 is executed for all the elements (knowledge items) of the knowledge list K and the loop processing L3 is executed for all the elements (members) of the list M, the process of FIG. 17 ends.

The following processing results can be obtained through the process of FIG. 17. FIG. 21 is a diagram illustrating a result of processing of narrowing down the knowledge according to the present embodiment.

In FIG. 21, items of specialized field of knowledge, specialized field of a member, and whether to exclude (whether to exclude knowledge) are illustrated, for each combination of a knowledge item and a member. In the example of FIG. 21, when the specialized field of the member does not include the specialized field of the knowledge, the knowledge is excluded from the knowledge list of the member.

As described above, according to the second embodiment, for knowledge extracted for a certain person (member), the probability that the person possesses the knowledge is determined, and knowledge whose probability is doubtful is determined not to be knowledge possessed by the person. Accordingly, the reliability of, for example, the association diagram and the result of the knowledge sharing determination can be increased.

The functionality of the elements disclosed herein may be implemented using circuitry or processing circuitry which includes general-purpose processors, special purpose processors, integrated circuits, application-specific integrated circuits (ASICs), digital signal processors (DSPs), field-programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

In order to continue business within an organization, the knowledge acquired through business operations is desired to be passed on to others, such as the next generation. For example, if a certain task is dependent on a specific individual, the smooth transfer of knowledge regarding that task may be hindered if the individual were to suddenly retire or leave. To avoid such situations, it is desirable for the knowledge used in the organization not to be overly dependent on specific individuals but rather shared as organizational knowledge (the knowledge is desired to be kept as information assets in the form of, for example, document data available to others).

However, "visualizing" of knowledge possessed by each individual is not sufficient to determine whether the knowledge is sufficiently shared within an organization.

According to one or more aspects of the present disclosure, the determination of the appropriateness for a sharing status of knowledge can be facilitated.

The present disclosure includes, for example, the following aspects.

Aspect 1

An information processing apparatus includes an acquisition unit to acquire, from a first data group, a second data group related to a person, the first data group including a plurality of types of data, an extraction unit to extract a character string indicating knowledge related to the person from the second data group, a determination unit to determine whether a sharing status of the knowledge is appropriate based on a third data group being an extraction source of the character string in the second data group, to obtain a determination result, and an output unit to output information based on the determination result.

Aspect 2

In the information processing apparatus according to Aspect 1, the determination unit determines whether a ratio of a predetermined type of data in the third data group matches a predetermined condition.

Aspect 3

In the information processing apparatus according to Aspect 1 or Aspect 2, the output unit outputs the information indicating an association between the character string and the person.

Aspect 4

In the information processing apparatus according to any one of Aspect 1 to Aspect 3, the extraction unit extracts the character string in a case that a category to which the knowledge indicated by the character string belongs matches a knowledge category associated with the person.

Aspect 5

In the information processing apparatus according to any one of Aspect 1 to Aspect 4, the acquisition unit acquires, from the first data group, the second data group related to each of a plurality of persons, and the extraction unit extracts, for each of the plurality of persons, a corresponding character string from the second data group related to the corresponding one of the plurality of persons.

The information processing apparatus according to any one of Aspect 1 to Aspect 4 further includes an estimation unit to estimate one or more associations among the plurality of persons based on one of the second data group related to each of the plurality of persons and one or more attributes of each of the plurality of persons.

In the information processing apparatus according to any one of Aspect 1 to Aspect 4, the output unit outputs the information indicating an association between each of the plurality of persons and the corresponding character string and the one or more associations among the plurality of persons.

Aspect 6

An information processing system includes an acquisition unit to acquire, from a first data group, a second data group related to a person, the first data group including a plurality of types of data, an extraction unit to extract a character string indicating knowledge related to the person from the second data group, a determination unit to determine whether a sharing status of the knowledge is appropriate based on a third data group being an extraction source of the character string in the second data group, to obtain a determination result, and output information based on the determination result.

Aspect 7

An information processing method performed by a computer includes acquiring, from a first data group, a second data group related to a person, the first data group including a plurality of types of data, extracting a character string indicating knowledge related to the person from the second data group, determining whether a sharing status of the knowledge is appropriate based on a third data group being an extraction source of the character string in the second data group, to obtain a determination result, and outputting information based on the determination result.

Aspect 8

A non-transitory recording medium storing a plurality of instructions which, when executed by one or more processors, causes the processors to perform a method, the method includes acquiring, from a first data group, a second data group related to a person, the first data group including a plurality of types of data, extracting a character string indicating knowledge related to the person from the second data group, determining whether a sharing status of the knowledge is appropriate based on a third data group being an extraction source of the character string in the second data group, to obtain a determination result, and outputting information based on the determination result.

The invention claimed is:

1. An information processing apparatus, comprising circuitry configured to:

acquire, from a first data group stored in an organization, a second data group related to a person of the organization, the first data group including document data created or updated by the person, chat data sent or received by the person, email data sent or received by the person, and meeting data of a meeting in which the person participates;

extract a plurality of character strings indicating knowledge related to the person from the second data group;

associate a plurality of knowledge items indicated respectively by the plurality of character strings with the person;

generate an association diagram representing an association between the plurality of knowledge items and the person;

transmit the association diagram to a user terminal for displaying the association diagram on a screen of the user terminal, the screen including a button configured to request a knowledge sharing determination;

in response to receiving a request for the knowledge sharing determination from the user terminal through an operation to the button, acquire a third data group that is an extraction source of the character strings in the second data group with respect to a specific knowledge item among the plurality of knowledge items;

determine a ratio of document data to total data in the third data group is equal to or greater than a predetermined ratio, or a number of pieces of document data in the third data group is equal to or greater than a predetermined number;

in response to determining that the ratio of document data in the third data group is equal to or greater than the predetermined ratio, or the number of pieces of document data in the third data group is equal to or greater than the predetermined number, output a result indicating that the specific knowledge item related to the person has been accumulated, to the user terminal; and in response to determining that the ratio of document data in the third data group is less than the predetermined ratio, or the number of pieces of document data in the third data group is less than the predetermined number, output a result indicating that the specific knowledge item related to the person has not been accumulated, to the user terminal.

2. The information processing apparatus of claim 1, wherein the circuitry is configured to extract the character strings in a case in which a category, to which the knowledge indicated by the character strings belongs, matches a knowledge category associated with the person.

3. The information processing apparatus of claim 1, wherein the circuitry is configured to:

acquire, from the first data group, the second data group related to each of a plurality of persons;

extract, for each of the plurality of persons, a corresponding character string from the second data group related to the corresponding one of the plurality of persons;

estimate one or more associations among the plurality of persons based on the second data group related to each of the plurality of persons or an attribute of each of the plurality of persons; and output the information indicating an additional association between each of the plurality of persons and the corresponding character string and the one or more associations among the plurality of persons.

4. The information processing apparatus of claim 1, wherein the circuitry is configured to extract the character strings indicating knowledge related to the person based on a high term frequency-inverse document frequency (TF-IDF) value.

5. An information processing system, comprising circuitry configured to:

acquire, from a first data group stored in an organization, a second data group related to a person of the organization, the first data group including document data created or updated by the person, chat data sent or received by the person, email data sent or received by the person, and meeting data of a meeting in which the person participates;

extract a plurality of character strings indicating knowledge related to the person from the second data group;

associate a plurality of knowledge items indicated respectively by the plurality of character strings with the person;

generate an association diagram representing an association between the plurality of knowledge items and the person;

transmit the association diagram to a user terminal for displaying the association diagram on a screen of the user terminal, the screen including a button configured to request a knowledge sharing determination;

in response to receiving a request for the knowledge sharing determination from the user terminal through an operation to the button, acquire a third data group that is an extraction source of the character strings in the second data group with respect to a specific knowledge item among the plurality of knowledge items;

determine a ratio of document data to total data in the third data group is equal to or greater than a predetermined ratio, or a number of pieces of document data in the third data group is equal to or greater than a predetermined number;

in response to determining that the ratio of document data in the third data group is equal to or greater than the predetermined ratio, or the number of pieces of document data in the third data group is equal to or greater than the predetermined number, output a result indicating that the specific knowledge item related to the person has been accumulated, to the user terminal; and in response to determining that the ratio of document data in the third data group is less than the predetermined ratio, or the number of pieces of document data in the third data group is less than the predetermined number, output a result indicating that the specific knowledge item related to the person has not been accumulated, to the user terminal.

6. An information processing method, comprising:

acquiring, from a first data group stored in an organization, a second data group related to a person of the organization, the first data group including document data created or updated by the person, chat data sent or received by the person, email data sent or received by the person, and meeting data of a meeting in which the person participates;

extracting a plurality of character strings indicating knowledge related to the person from the second data group;

associating a plurality of knowledge items indicated respectively by the plurality of character strings with the person;

generating an association diagram representing an association between the plurality of knowledge items and the person;

transmitting the association diagram to a user terminal for displaying the association diagram on a screen of the user terminal, the screen including a button configured to request a knowledge sharing determination;

in response to receiving a request for the knowledge sharing determination from the user terminal through an operation to the button, acquiring a third data group that is an extraction source of the character strings in the second data group with respect to a specific knowledge item among the plurality of knowledge items;

determining a ratio of document data to total data in the third data group is equal to or greater than a predetermined ratio, or a number of pieces of document data in the third data group is equal to or greater than a predetermined number;

in response to determining that the ratio of document data in the third data group is equal to or greater than the predetermined ratio, or the number of pieces of document data in the third data group is equal to or greater than the predetermined number, outputting a result indicating that the specific knowledge item related to the person has been accumulated, to the user terminal; and in response to determining that the ratio of document data in the third data group is less than the predetermined ratio, or the number of pieces of document data in the third data group is less than the predetermined number, outputting a result indicating that the specific knowledge item related to the person has not been accumulated, to the user terminal.

7. A non-transitory recording medium storing a plurality of instructions which, when executed by one or more processors, cause the processors to perform the method of claim 6.

*  *  *  *  *